(12) United States Patent
Nolan et al.

(10) Patent No.: US 6,229,937 B1
(45) Date of Patent: May 8, 2001

(54) CIRCULARLY POLARIZED FIBER IN OPTICAL CIRCUITS

(75) Inventors: Daniel Aloysius Nolan, Corning, NY (US); Mohammed Nazrul Islam, Ann Arbor, MI (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/339,446

(22) Filed: Jun. 24, 1999

Related U.S. Application Data
(60) Provisional application No. 60/101,282, filed on Sep. 22, 1998, and provisional application No. 60/100,757, filed on Sep. 17, 1999.

(51) Int. Cl.[7] ................................................. G02B 6/28
(52) U.S. Cl. ............................................. 385/24; 385/11
(58) Field of Search ............................. 385/123, 24, 11, 385/46

(56) References Cited

U.S. PATENT DOCUMENTS

| | | | |
|---|---|---|---|
| 4,427,717 | 1/1984 | Gauthier | 427/163 |
| 4,515,436 | 5/1985 | Howard et al. | 350/96.33 |
| 4,697,876 * | 10/1987 | Dyott | 350/96.29 |
| 5,078,464 | 1/1992 | Islam | 385/122 |
| 5,096,312 * | 3/1992 | Huang | 385/11 |
| 5,452,394 | 9/1995 | Huang | 385/123 |
| 5,587,791 | 12/1996 | Belleville et al. | 356/345 |
| 5,848,205 | 12/1998 | Bigo | 385/15 |

FOREIGN PATENT DOCUMENTS 0582405   7/1993 (EP) .

OTHER PUBLICATIONS

Rashleigh, Scott C., "Origins and Control of Polarization Effects in Single–Mode Fibers", IEEE 1983, pp. 312–331.
Jeunhomme et al., "Polarization–maintaining single–mode cable design", Electron Letters, 1980, vol. 16, p. 921.
U.S. application No. 09/117,280, Hawk 12.

* cited by examiner

*Primary Examiner*—Hung N. Ngo
(74) *Attorney, Agent, or Firm*—William J. Chervenak (57) ABSTRACT

The invention is directed to circularly polarized single mode waveguide fiber and to high data rate, multiplexed transmission systems that employ this fiber. The circularly polarized waveguide fiber attenuates the non-linear effects present in such high performance transmission links. In particular, self phase modulation is attenuated by more than 30% and four wave mixing is essentially eliminated. This latter effect occurs because four wave mixing does not occur when a multiplexed link is made of a plurality of circularly polarized waveguide fibers which are arranged so that adjacent fibers have opposite circular polarization. The circularly polarized fiber enhances the non-linear effect of cross phase modulation, a feature that can be used in optical switching components associated with the transmission link. In addition, the strength of the XPM in CPF is independent of the relative polarization states of the signal and control pulses.

15 Claims, 9 Drawing Sheets

CIRCULARLY POLARIZED FIBER IN OPTICAL CIRCUITS

CROSS-REFERENCE TO RELATED APPLICATIONS

This application claims the benefit of U.S. Provisional Application Ser. No. 60/100,757 filed Sep. 17, 1998 and U.S. Provisional Application Ser. No. 60/101,282, filed Sep. 22, 1998.

BACKGROUND OF THE INVENTION

1. Field of the Invention

The present invention relates generally to systems that use optical fiber and optical fiber components, and particularly to such systems that include circularly polarized waveguide fiber.

2. Technical Background

The optical non-linearities that affect light wave transmission systems fall into two general categories. In the first category are stimulated scattering phenomena, such as stimulated Brillouin scattering and stimulated Raman scattering. These effects are interactions between an optical signal and a phonon in the transmission material. The frequency of the phonon determines the type of scattering that occurs. In the second category, the nonlinear index of refraction gives rise to three effects, self phase modulation (SPM), cross phase modulation (XPM), and four wave mixing (4WM). Based on studies of long-distance, multi-wavelength systems, the second category of nonlinear interactions are most deleterious for wavelength division multiplexed (WDM) systems, especially those having electronic regenerator spacing greater than about 50 km. This second category of non-linear effects is the subject of the present application.

In SPM, the nonlinear index, which depends upon pulse intensity, leads to phase modulation of those pulses above a threshold intensity. The threshold intensity depends upon the material used in the waveguide but is generally of the order of 10 mW. One of the consequences of SPM is that the spectral width of signal pulses gradually increases as they propagate in the fiber. For operation near the zero dispersion wavelength of the waveguide, the spectral broadening of the signal will not degrade system performance. However, if there is sufficient group velocity dispersion, then the spectral broadening from SPM will result in temporal broadening of the pulses. Alternately, in densely spaced WDM systems, cross-talk will occur if the spectral broadening is large enough to cause spectra of a broadened signal to appear in adjacent channels to overlap those channels.

For WDM systems, the intensity variations in one channel can affect the other channels through XPM. For linearly polarized fiber, the XPM coefficient, which indicates the size of the effect, is about twice as large as the SPM coefficient. XPM does depend upon the length of waveguide over which interaction between pulses occurs so that change in spacing (walk-off) between channels due to group-velocity dispersion affects the interaction length and thus the amount of XPM. For sufficiently long systems, the group velocities of various channels will lead to complete walk-through between the channels. Thus, under loss-free conditions, the spectral broadening from XPM is virtually eliminated.

Four wave mixing also arises from the nonlinear index of refraction, but, unlike SPM and XPM, 4WM has a phase matching requirement. For signals at two different wavelengths, the intensity modulation at the beat frequency of the waveguide modulates the refractive index, thus producing a phase modulation at the difference frequency of the two signals. Consequently, in 4WM, side-band frequencies are generated at the original frequencies plus and minus the difference frequencies (the lower frequency side band is called the Stokes frequency, and the higher frequency side band is called the anti-Stokes frequency). The phase-matching requirement means that the index or speed at the two signal wavelengths must coincide with the index or speed of the Stokes and anti-Stokes waves. Therefore, 4WM depends strongly on total dispersion. For high total dispersion, the difference in propagation velocities at the different frequencies is large, and the efficiency of 4WM is poor. In fibers with the zero dispersion wavelength near the signal wavelengths, all waves are nearly coincident in index and speed and the 4WM process can be extremely efficient. In WDM systems, 4WM has two deleterious effects. First is the depletion of power from the signal wavelengths into the mixing products. Second, in systems that have equally spaced signal channels, the Stokes and anti-Stokes frequencies coincide with existing channels causing cross-talk. Also, the mixing products can interfere constructively or destructively with the existing channels, depending on the relative phases of the signals.

In high performance transmission systems, therefore, there is a need for a system configuration, which can include a particular type of optical waveguide fiber, that permits operation close to the zero dispersion wavelength, thus minimizing the linear dispersion penalty, but which still limits the non-linear effects, especially 4WM.

Glossary

The following terms are defined in accord with common usage in the art.

A quarter-wave retarder (QWR) converts linearly polarized light into circularly polarized light and conversely. For optimum efficiency, the linearly polarized light is incident upon the QWR with its polarization axis at 45° to the right or left of the fast axis of the QWR.

A half-wave retarder (HWR) rotates the polarization direction of linearly polarized light by 90 degrees. For optimum efficiency, the linearly polarized light is incident upon the HWR with its polarization axis at 45° to the right or left of the fast axis of the HWR. A HWR converts right-hand circularly polarized light (RHC) into left-hand circularly polarized light (LHC) and conversely.

Therefore, placing a QWR at the input and output of the CPF enables all linearly-polarized optics employed in the application in which the CPF is used.

Fiber QWR's and HWR's are implemented in fibers by folding the fiber into a number of loops and rotating the loops relative to one another. A fiber HWR is shown schematically as 33 in FIG. 7. The birefringence induced by rotation of the fiber provides for the phase retardation between the two field vectors that mathematically define the polarization state of the light.

SUMMARY OF THE INVENTION

One aspect of the present invention is a circularly polarized single mode fiber (CPF). The CPF has at least a slight birefringence and an axial twist that is substantially continuous along the CPF length. The pitch of the axial twist is less than the beat length of the CPF so that circular polarization effects are large compared to linear polarization effects in the CPF. Beat length is the fiber length between repeats of a given polarization state.

The CPF is so called because it preserves propagated circularly polarized light in a state of circular polarization, given that the launch orientation of the light matches a polarization mode of the fiber. The required launch is assumed throughout this application. The CPF maintains the circular polarization of circularly polarized light (either right or left handed circularly polarized light) that is launched into the CPF.

In one embodiment of the CPF, the birefringence is Δn about $10^{-5}$, where Δn is the difference in refractive index of the two orthogonal polarization axes of the waveguide fiber. The fiber can be made to have birefringence by any of several methods known in the art. For example the core can be made elliptical in cross section or a non-uniform radially directed stress may be applied to the core.

In a further embodiment of the CPF, the applied twist has a right handed pitch over a portion of the fiber length and left handed pitch over another portion.

In another aspect, the present invention includes an optical transmission link for high data rate, multiplexed systems. The link makes use of CPF to suppress the non-linear effects that occur in systems using high power signals or make use of multiple wavelength channels. The transmission link is formed from a plurality of CPF's optically coupled to each other. The first CPF in the link is optically coupled to a multi-wavelength transmitter module and the last CPF in the link is optically coupled to a multi-wavelength receiver module. Alternating the pitch from right to left handed polarized light for alternating channels, effectively eliminates four wave mixing, the non-linear effect, which, in multiplexed systems, causes signal power loss an inter-channel cross talk.

In an embodiment of the transmission link, one or more optical amplifiers are optically coupled into the link to maintain desired signal to noise ratio. The transmission link may make use of local or distributed optical amplifiers, which can have any appropriate spacing.

Embodiments of the invention which include desirable configurations of the transmitter or receiver module are discussed below.

In a further embodiment of the invention, particular optical switching or delaying circuits may be added to the transmission link. These circuits provide capability for the transmission link to route or switch signals in several advantageous configurations. In particular, the use of cross phase modulation in non-linear optical loop mirrors (NOLM) or in polarization controlled systems (PCS) using polarization sensitive couplers are described in detail below. A feature of these circuits is that CPF is used at least over a portion of the circuit where the control signal and optical signal interact. The CPF enhances the cross phase modulation interaction between the two pulses so that lower control pulse power or shorter interaction lengths of fiber may be used. An advantage of using CPF in optical components which make use of XPM is that the XPM is not dependent upon relative polarization state, including circular or linear polarization, of the interacting signals. The signal launch into the CPF should be an eigenmode supported by the CPF to achieve the benefit of polarization independence of XPM, in accordance with the launch condition disclosed above.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Figure 1:
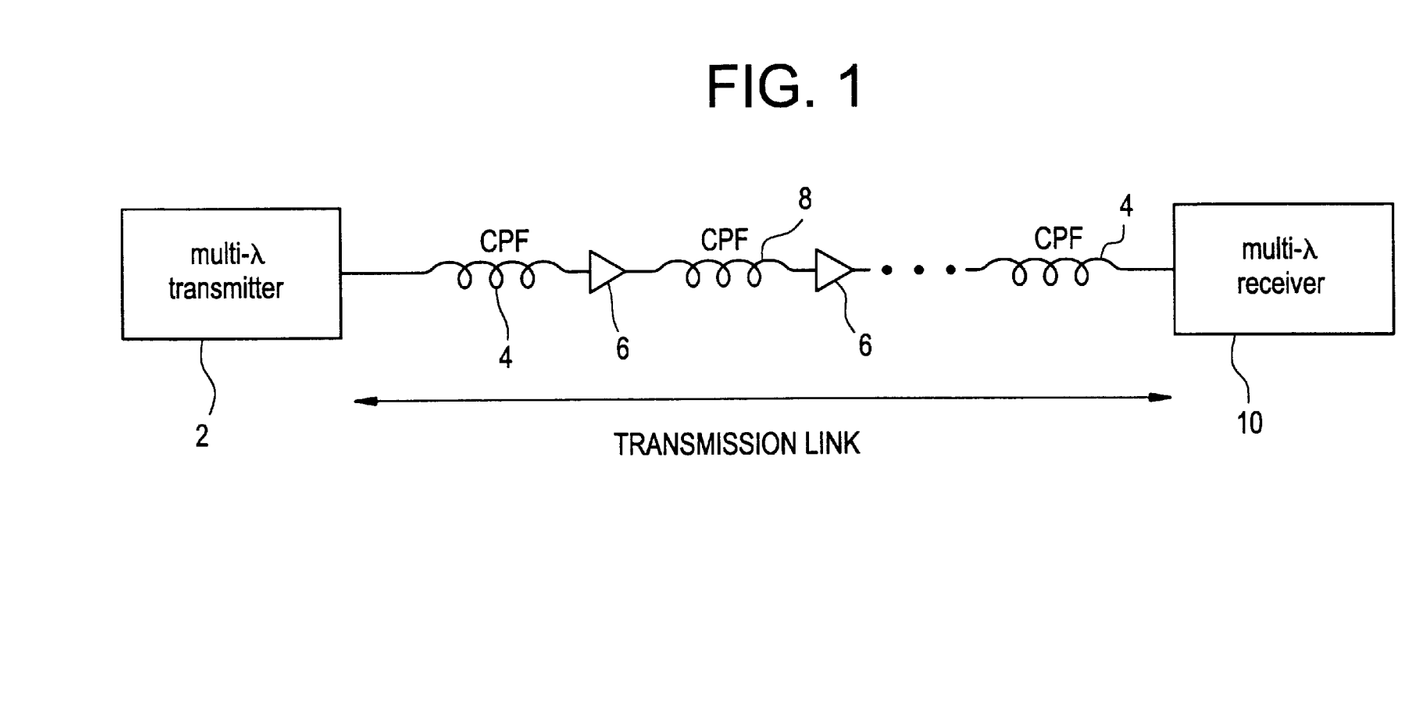
FIG. 1 is a schematic drawing of a multi-channel transmission link using CPF.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the CPF circuit of the present invention is shown in FIG. 1. In this embodiment, a multi-wavelength transmitter module 2 launches wavelength division multiplexed (WDM) signal pulses into a first length of circularly polarized fiber 4. (Wavelengthm division multiplexer and demultiplexer devices currently suitable for WDM networks may be based on wavelength grating routers, littrow gratings, or Fabry-Perot or Mach-Zehnder interferometers.) After traveling through this first CPF length 4, the WDM pulses are amplified by optional optical amplifier 6 and pass into a second length of CPF 8. The WDM pulses continue through alternating lengths of CPF 4 and CPF 8, which are optionally separated by optical amplifiers 6, until reaching the multi-wavelength receiver module 10 where WDM demultiplexing occurs and the signals are distributed to a target destination.

The optical circuit of FIG. 1 may comprise CPF having a zero dispersion wavelength, $\lambda_o$, near the signal wavelengths without incurring signal loss due to 4WM. The use of CPF reduces the SPM dispersion. The circuit may be operated in non-return-to-zero, return-to -zero, or soliton format.

Figure 2:
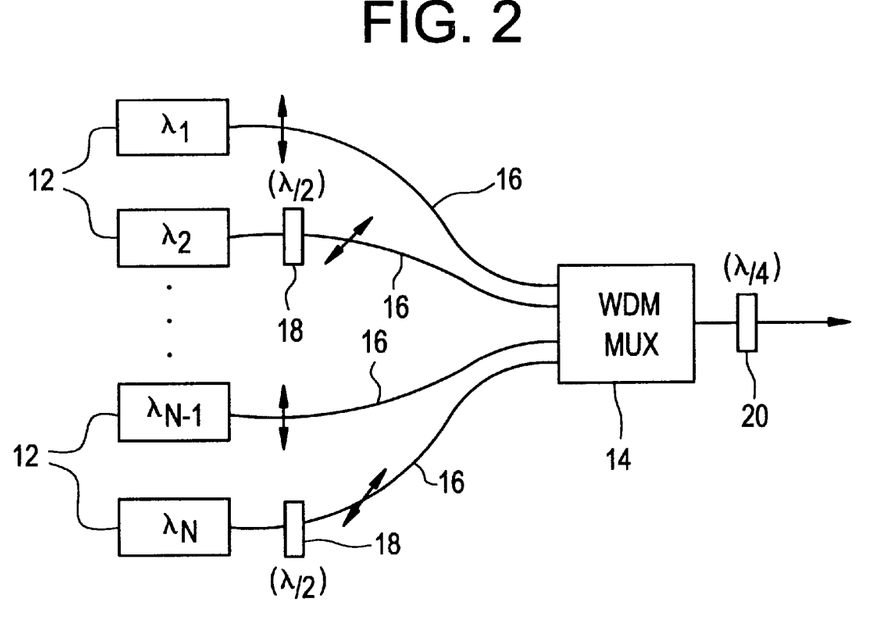
FIGS. 2 and 3 are schematic drawings of alternative configurations of the transmitter module.

In an embodiment of the invention, the transmitter module contains a number N of lasers designated as 12 in FIG. 2. The lasers launch linearly polarized light into the N ports of WDM device 14. A HWR 18 is inserted into every other path 16 between a laser and the WDM 14 to change the direction of linear polarization by 90°. The polarization is preserved through WDM 14 so that, upon passing through QWR 20, signals in adjacent channels are launched with opposite handed circular polarization into to the CPF and 4WM penalty is minimized. Although there will be no 4WM between adjacent channels, there may still be some 4WM between alternate channels. However, the phase-matching and interaction length is made smaller because the wavelength because the spacing the interacting wavelength channels are farther apart. The density of channels can thus be traded off for less inter-channel interaction.

Figure 3:
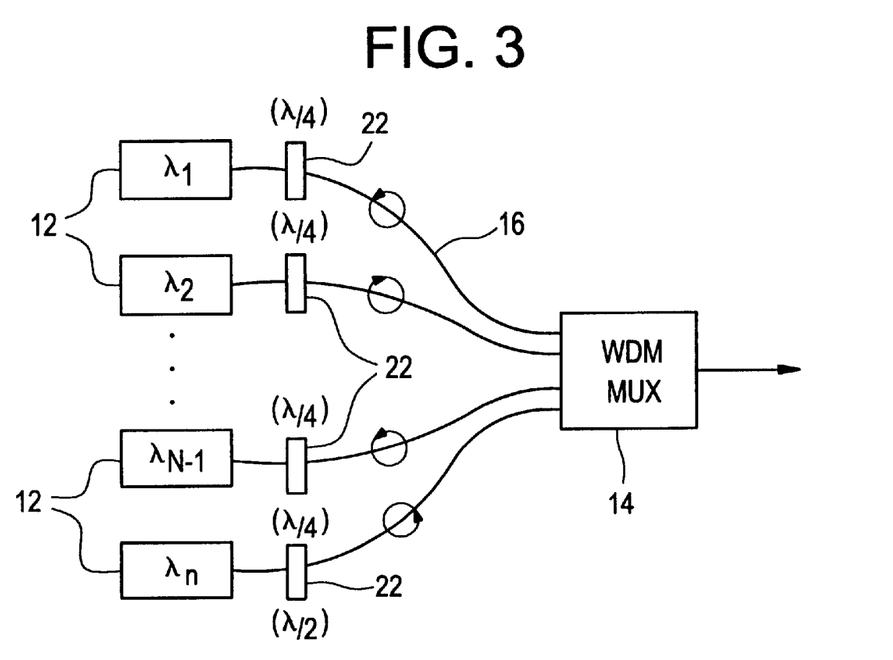

An alternative transmitter module embodiment is shown in FIG. 3. In this embodiment the N lasers 12 are connected to the ports of WDM 14 through QWR's 22, which convert the linearly polarized laser light into circularly polarized light. The direction of circular polarization of signals in adjacent channels is opposite one from the other because the fast axis of every other QWR is rotated 90° compared to the QWR's adjacent. The result is a multi-wavelength signal launch into the CPF link substantially identical to that illustrated in FIG. 2. If the wavelength range is wide, then there may be an advantage is using the FIG. 3 scheme over that of FIG. 2. The QWR in FIG. 2 may not be broad band enough to launch all the wavelengths. A practical advantage of both the FIG. 2 and FIG. 3 schemes is that the QWR also provides isolation between the emitter (e.g., a laser diode) and reflections from the following optics.

The QWR's and HWR's may be bulk optical plates or other devices known in the art. However a preferred embodiment is one in which the QWR's and HWR's comprise optical fiber which is formed into loops which are rotated relative to one another. The fiber devices are easier to incorporate into the optical circuit and reflection and absorption losses are minimized.

Figure 4:
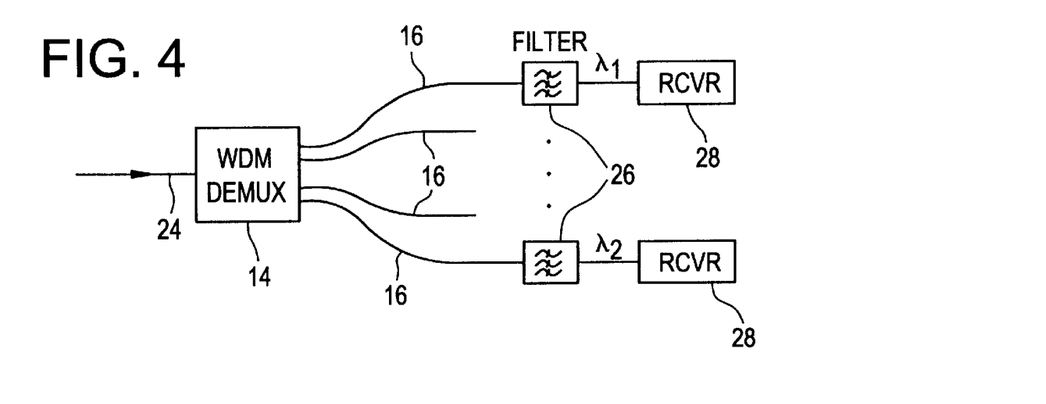
FIGS. 4, 5, and 6 are schematic drawings of alternative configurations of the receiver module.
Figure 5:
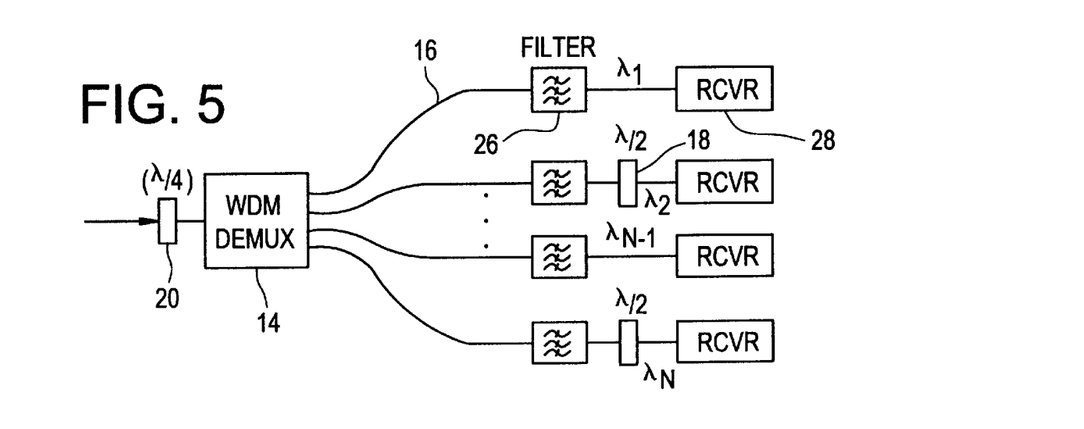
Figure 6:
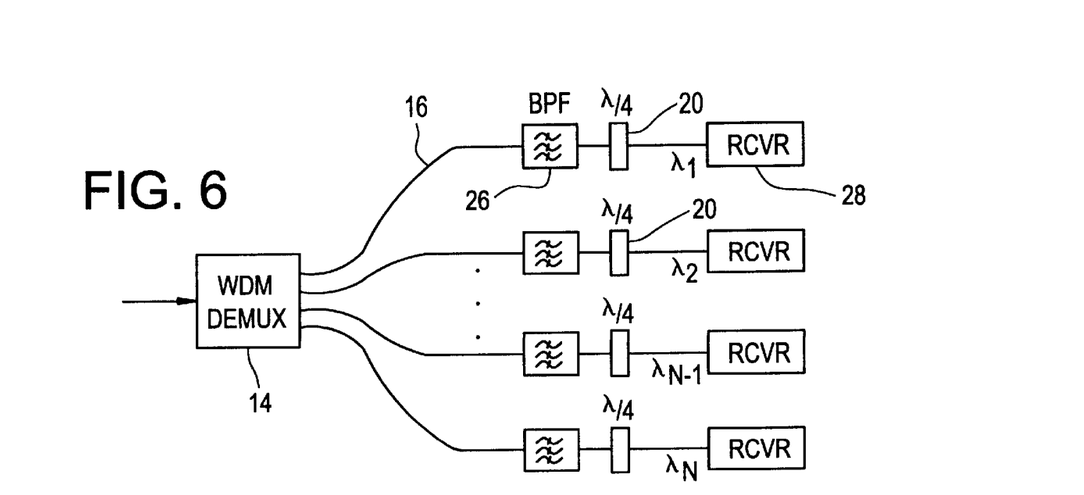

Alternative embodiments of the receiver module are illustrated schematically in FIGS. 4, 5, and 6. In the embodiment of FIG. 4, light enters the input port of WDM demultiplexer 14 from the last CPF 24 in the link. The de-multiplexed signals are connected to band pass filters 26 through waveguides 16. The filters deliver one of the N signals to each of the receivers 28 respectively.

The embodiment of FIG. 5 makes use of a polarization sensitive receiver 28 to further improve signal to noise ratio. The circularly polarized light passes through QWR 20 before entering WDM demultiplexer 14. The circularly polarized signals are thereby converted in linearly polarized signals. A HWR 18 is placed in every other path between the filters 26 and polarization sensitive receivers 28. This HWR rotates the axis of polarization by 90° so that adjacent channels have orthogonal linear polarization.

The receiver module embodiment of FIG. 6 makes use of QWR's in the optical path between filter 26 and polarization sensitive receivers 28. The fast axes of QWR's of adjacent paths are rotated 90° relative to each other. Thus channel cross talk between receivers is further limited because alternate receivers receive signals having opposite circular polarization.

As mentioned in the discussion of the transmitter module embodiments, the receiver module configurations of FIGS. 5 and 6 have the added advantage of providing isolation between the transmission line and the receivers.

Figure 7:
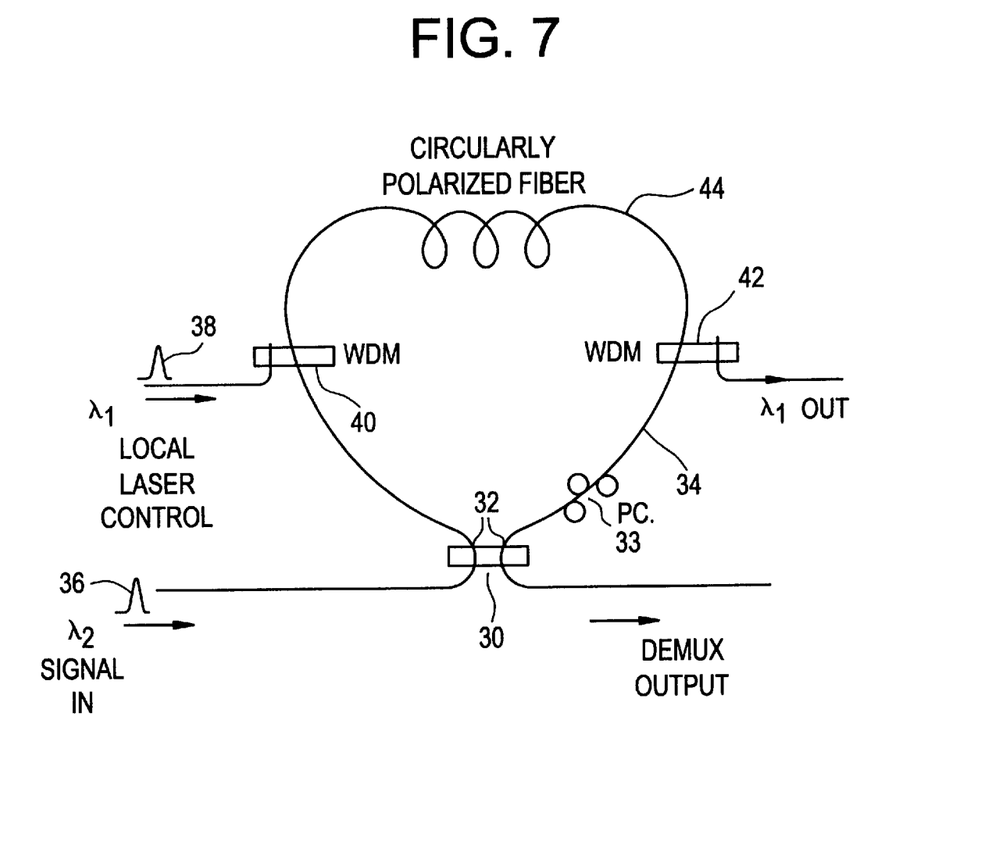
FIG. 7 is a schematic drawing of a NOLM switch using CPF.

A switching component using a NOLM is illustrated in the schematic of FIG. 7. The all fiber construction of the NOLM makes it particular compatible with the transmission link of FIG. 1. The NOLM may be used to switch a selected wavelength at essentially any point along the transmission link.

The NOLM consists of a four-port directional coupler 30 in which two ports 32 on one side are connected by a loop of fiber 34. The NOLM acts an interferometer having two arms which correspond to the two counter-propagating directions around the loop. This configuration is very stable because both arms involve exactly the same optical path.

When the coupler divides the input signal 36 equally, the NOLM acts as a perfect mirror. By adding a control signal 38 that is orthogonal either in frequency or polarization, the NOLM can also act as a three-terminal switch. In particular, control signal 38 is coupled into the NOLM by coupler 38 and propagates only in one direction around the NOLM. The control signal 38 phase shifts the input signal 36 traveling in that direction by means of the non-linear XPM. Therefore, when the control and signal pulses are incident at the coupler in phase, an output results from the NOLM. This output is maximum for a $\pi$-phase shift through XPM. The output has been shown to vary as the square of a trigonometric function of the phase shift angle. The efficiency of the NOLM is increased by using CPF 44 for at least a portion of the loop over which the control and signal pulses interact. As discussed above, the XPM effect is enhanced in CPF and the enhancement is not dependent upon the relative polarization of the respective signals interacting in the CPF. Thus the loop length may be made shorter or the amplitude of the control pulse made smaller.

Figure 8:
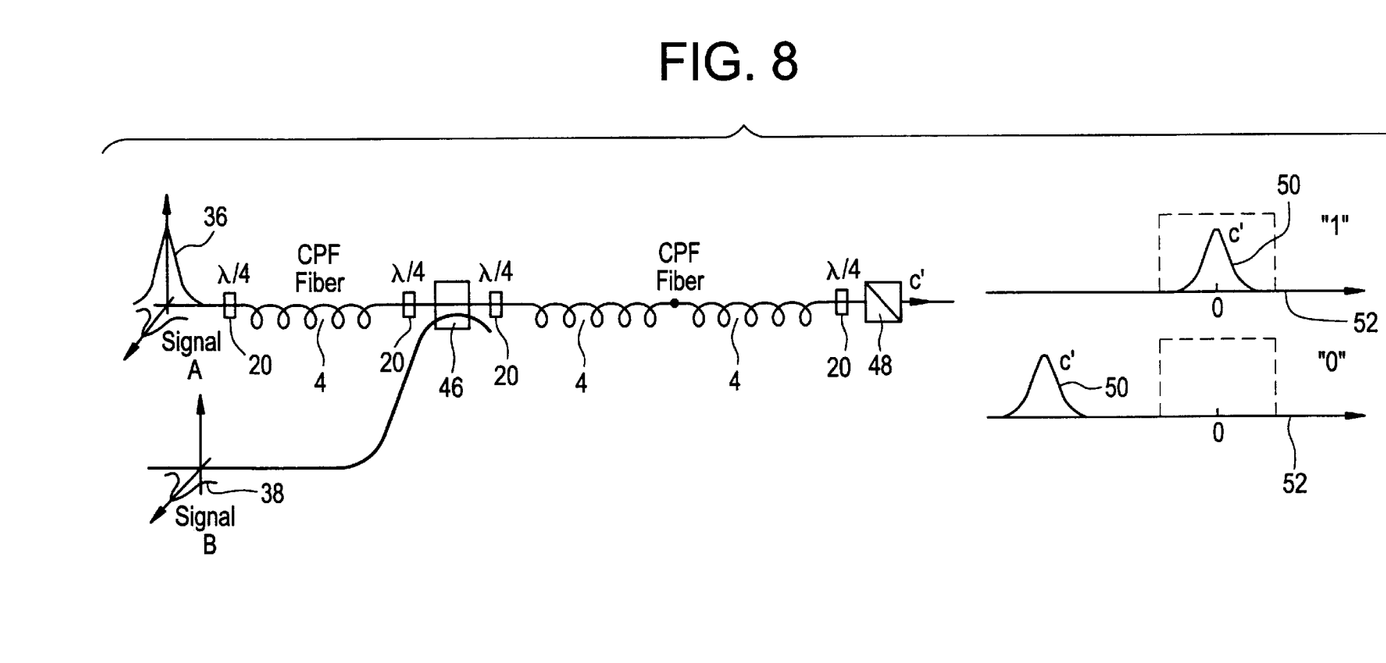
FIG. 8 is a schematic drawing of a polarization coupled switch using CPF.

Another embodiment of a switch compatible with the transmission link of FIG. 1 is illustrated in FIG. 8. A linearly polarized signal pulse 36 is circularly polarized by QWR 20 before launch into CPF 4. The CPF preserves the polarization so that the second QWR 20 converts the pulse 38 into a linearly polarized pulse before entering polarization sensitive coupler 46. Coupler 46 passes the linearly polarized signal pulse 36 and couples one polarization component from control pulse 38. Both pulses are converted into circularly polarized pulses by the QWR 20 located in the optical path downstream of coupler 46. The signal and control pulses interact through XPM in the CPF lengths 4 downstream of coupler 46. The direction of circular polarization of the signal and control pulses can be selected to be opposite in direction so that at the QWR just ahead of the polarization sensitive filter 48 the two signals are converted to linearly polarized pulses whose axes of polarization are orthogonal. Then the polarization sensitive filter 48 is selected to pass the signal pulse and reflect the control pulse. The effect of the XPM interaction is illustrated by the side figure of FIG. 8 which shows the output signal pulse 50 on a time axis 52. The XPM interaction can be sufficient to move the signal pulse 50 out of a particular clock window thereby changing a 1 bit to a 0 bit in a digital system.

The CPF waveguide can be made by any of several methods known in the art. For example, an appropriate reference is U.S. application Ser. No. 09/117,280, Hawk, which is herein in its entirety incorporated by reference. In general the reference sets forth a method of making CPF by starting with a preform designed to produce a fiber which has a moderate birefringence. During the drawing process a twist is impressed upon the fiber by twisting either the preform or the fiber itself. For example, the fiber may be twisted by spinning the drawing tractors back and forth about the long axis of the fiber, introducing a sinusoidal twist of the fiber axes. For circular birefringence to dominate over linear birefringence the twist pitch must be shorter than the beat length of the fiber.

A fiber that has a moderate birefringence is one having $\Delta n \equiv 10^{-5}$, $\Delta n$ being the refractive index difference between the fast and slow axes. This level of birefringence is readily induced, for example, by making the core slightly elliptical or by implanting in the fiber a non-uniform radial stress.

Example of a NOLM Switch Incorporating Twisted Fiber

Figure 9:
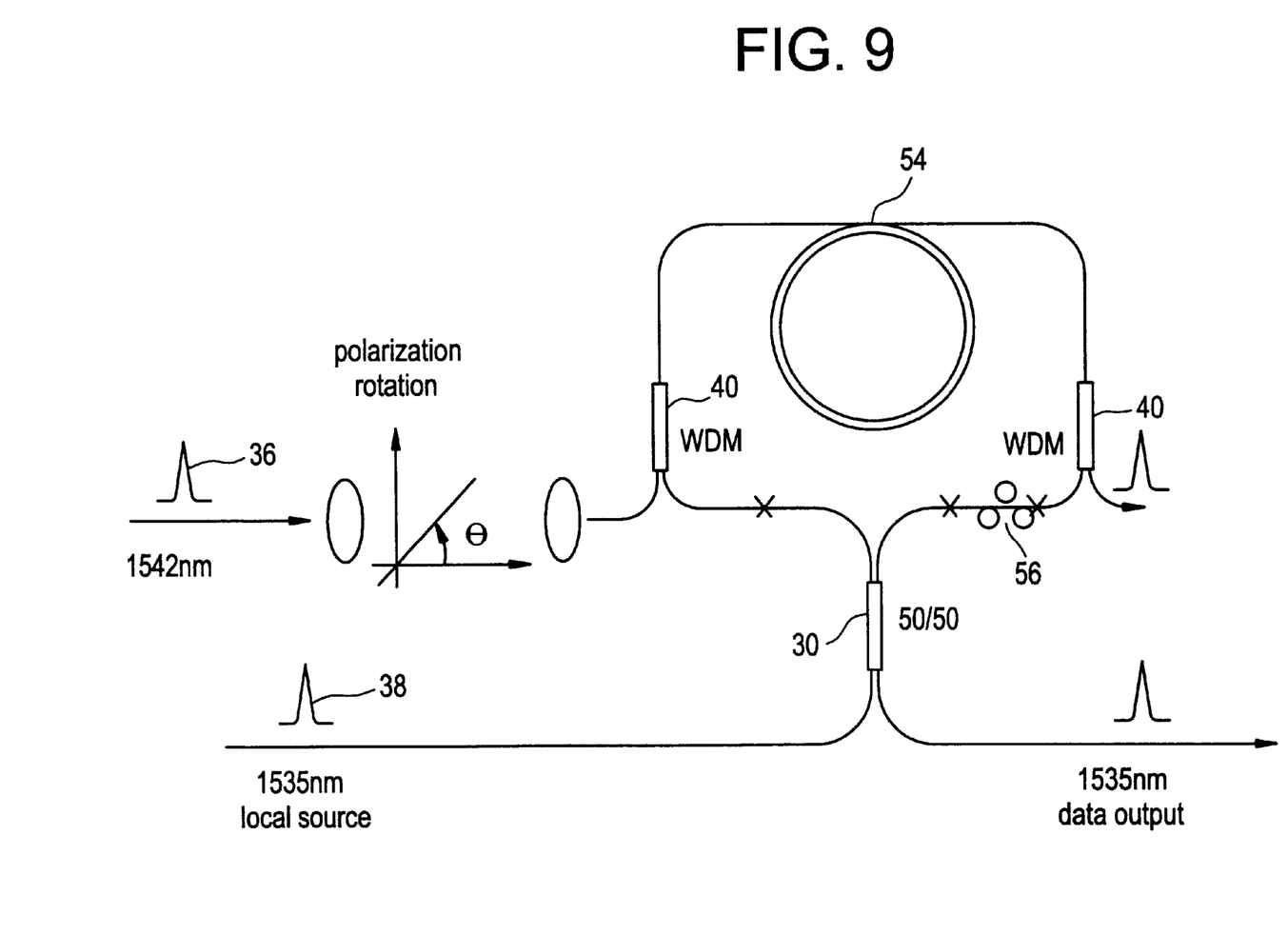
FIG. 9 is a schematic drawing of an experimental circuit used to test the NOLM switch using CPF.

The predicted efficiency of CPF in optical communications circuits and devices was tested using the NOLM switch shown schematically in FIG. 9. The signal pulse 38 at 1535 nm is launched through the 50/50 coupler to counter-propagate around the loop mirror. The control pulse was polarized and launched into the loop by means of polarization sensitive coupler 40 and extracted by downstream polarization sensitive coupler 40. This extraction method is most useful because the relative polarization states of the signal and control pulses does not affect the XPM interaction. The control and signal pulses interacted through XPM in the top sector of the loop including waveguide fiber length 54. The efficiency of the switching was measured by measuring the intensity of the 1535 nm output pulse switched through the NOLM. The folded fiber polarization controller 56, similar to 33 in FIG. 7 discussed above, was adjusted to maximize signal output.

Figure 10:
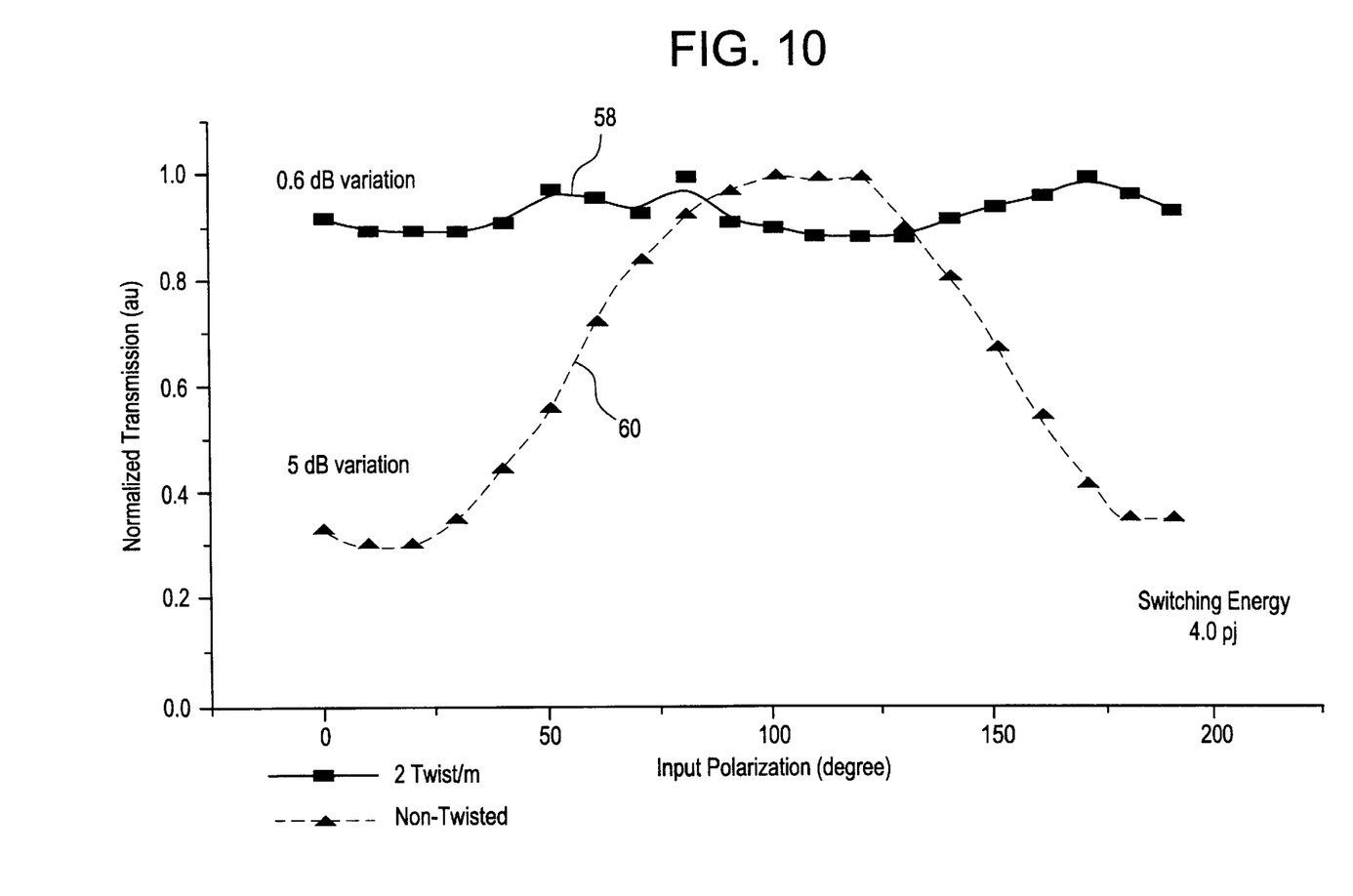
FIGS. 10 and 11 are charts of experimental results comparing twisted fiber (CPF) to non-twisted fiber.

The experiment was carried out using twisted and then non-twisted fiber as fiber length 54. The results are shown in the chart of FIG. 10. Curve 58 shows the variation of output signal intensity as a function of polarization of the input signal 38 for the case in which fiber length 54 is twisted. The curve 58 shows the switch is substantially polarization independent when twisted fiber is used. An intensity variation of only 0.6 dB was observed over a polarization change from 0 to 200 degrees.

When fiber length 54 was untwisted fiber the output intensity was found to follow curve 60 in FIG. 10. The variation in signal output intensity is about 5 dB over the 0 to 200 degree range of polarization. The use of CPF affords an order of magnitude improvement in the NOLM efficiency. The polarization independence of XPM as well as the twofold enhancement of the effect in CPF is of use in optical transmission links and the optical circuits associated with such links.

Figure 11:
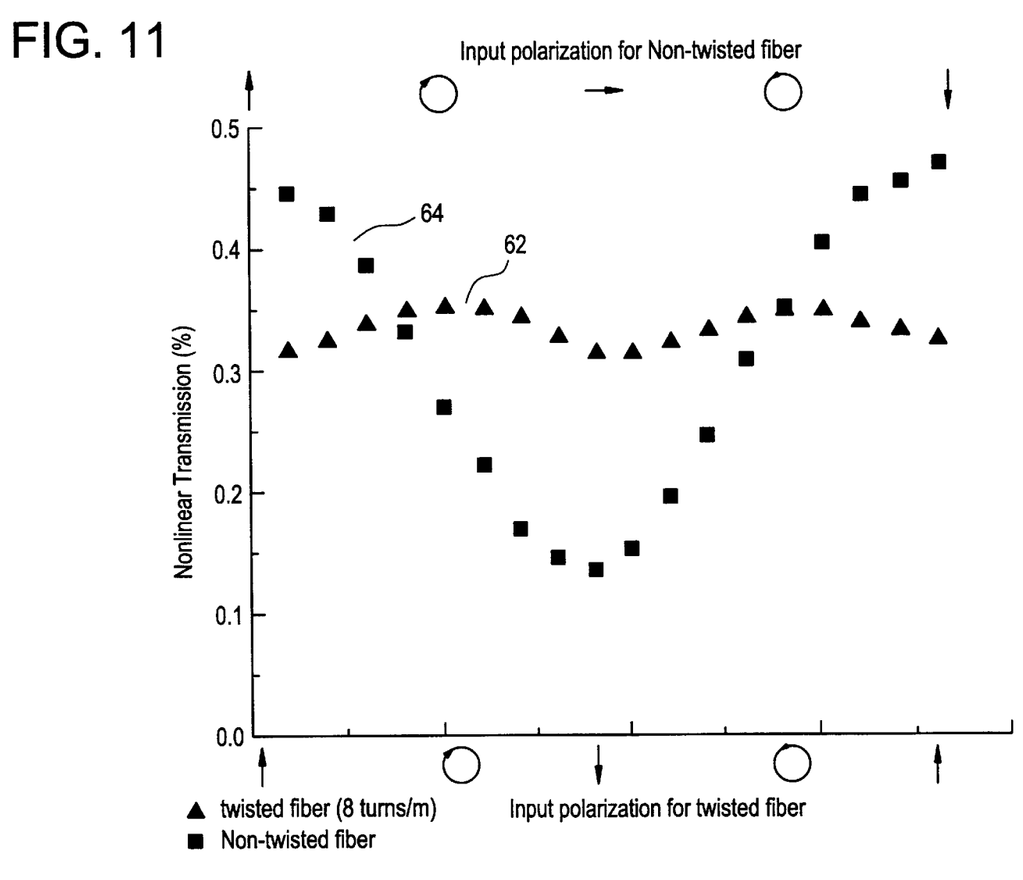

The chart shown in FIG. 11 gives the percent non-linear transmission through twisted and non-twisted fiber for changes in polarization state of the input signal. The polarization states are indicated at the top and bottom of the chart as up or down arrows for linearly polarized signals and right and left hand loops for the two types of circular polarization. A CPF having a twist of 8 turns/m shows in curve 62 about 0.05% variation in non-linear signal transmission for all of the polarization states. A variation of about 0.3%, curve 64 in FIG. 11, was measured for the untwisted fiber for the same changes in input signal polarization state. Here again the CPF provides an order of magnitude improvement in polarization insensitivity as compared to the untwisted fiber.

Figure 12:
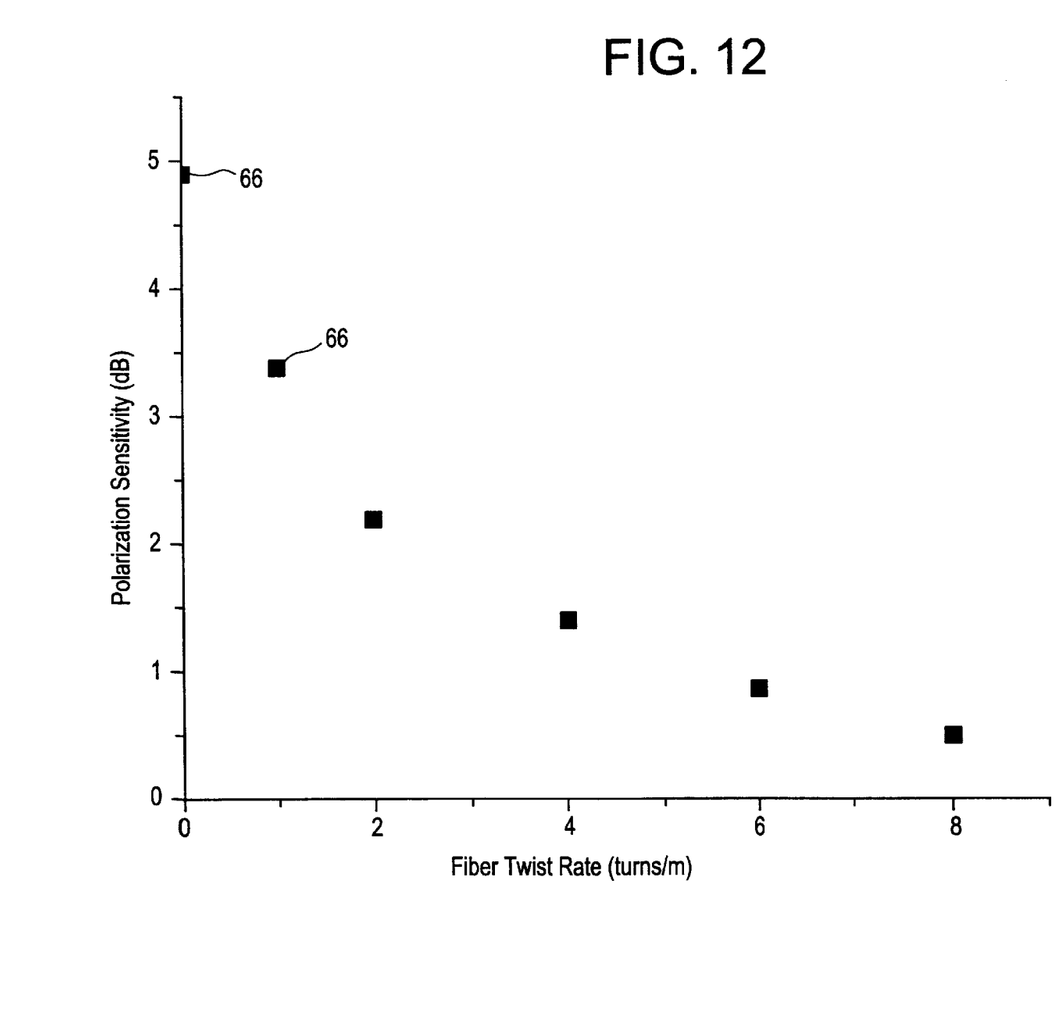
FIG. 12 is a chart of polarization sensitivity versus the pitch of the twist in the CPF.

Experimental chart 12 shows in date points 66 that polarization insensitivity does depend upon the number of axial twists per meter. In general, good results may be expected for twist rates greater than about 6/meter.

In addition to the advantageous features of CPF in non-linear phenomena, there are also a number of interesting linear properties of CPF that are of practical importance. First, wrapping and packaging of CPF is simpler because it appears to be resistant to many external perturbations. For example, experience in cabling of fiber shows that less perturbation is introduced in CPF compared to linearly birefringent fiber. This feature can be used in optical circuits used in cases where space is limited such as in small enclosures. Secondly it has been shown by Jeunhomme et al, "Polarization-maintaining single-mode cable design", Electron. Lett. 16, 921 (1980) that CPF can be spliced without introducing mode coupling between the two polarization modes. In particular, linearly birefringent fibers require accurate alignment of the birefringence axes of the two fibers involved in a joint to maintain high polarization extinction ratio. Cross-coupling at splice joints is directly proportional to the overlap integral between the desired polarization state of the incoming fiber and the undesired polarization state of the outgoing fiber. For CPF, the cross-coupling at the joints will always be zero whatever the orientation of the two fibers because the overlap integral between right and left circularly polarized light is always zero. Consequently, a polarization maintaining transmission line can be comprised of various sections of CPF without any need for orienting the fibers at splices.

In summary the benefits provided by CPF in transmission links and associated optical components can be stated as follows. The general problem of signals at two wavelengths of light interacting through the nonlinear index of refraction, where one wave imparts a phase shift on the other wave is best solved using CPF. This nonlinear interaction is independent of the input state of polarization of the waves because the XPM is the same when the two waves are parallel or identical in polarization ($XPM_\parallel$) as when the input state of polarization of the waves are perpendicular or orthogonal ($XPM_\perp$).

In addition, if the device using the nonlinear interaction is an interferometer, then the two beams through each arm of the interferometer must end at the same state of polarization for there to be complete interference at the output coupler or beam splitter. In general, using a polarization controller (PC) on one or both beams can satisfy this condition. However, it is undesirable to use PC's, since. they may require periodic adjustment to compensate for environmental changes. The use of PC's can be avoided if CPF is used to assure that the two arms of the interferometer retain the same state of polarization.

The use of circularly polarized waveguide fiber (CPF) has been shown to reduce the SPM effect by a factor of about ⅔ compared to a linearly polarized fiber. More advantageously, 4WM between opposite handed light waves (left and right hand circularly polarized) is non-existent. In effect, there is no non-linear 4WM of signals launched having opposite-handed circular polarization. For this case there is no 4WM penalty for operating near the zero dispersion wavelength.

Also polarization mode dispersion (PMD) is decrease in CPF because CPF is polarization maintaining fiber.

The use of CPF increases the XPM effect by about a factor of 2 compared to linearly birefringent fiber. The enhancement in XPM which is valuable in switching devices, but can lead to cross talk in WDM transmission links. However, the deleterious XPM in such links can be minimized by proper spacing of the channels, i.e., by arranging for the channels to completely walk through each other due to XPM dispersion.

Examples of switches which can be made more efficient by use of CPF are nonlinear optical loop mirrors or soliton-dragging and soliton-trapping logic gates. Because these switches make use of XPM to carry out the switching function, the use of CPF in these devices provides switching at half the switching energy or half of the waveguide fiber length as compared to the same devices implemented using linearly polarized fibers.

The CPF can be one of the key enabling technologies toward reaching the sub-picojoule switching energy that will be required for all-optical switches in high performance systems.

It will be apparent to those skilled in the art that various modifications and variations of the present invention can be made without departing from the spirit and scope of the invention. Thus, it is intended that the present invention include the modifications and variations of this invention provided they come within the scope of the appended claims and their equivalents.

We claim:

1. An optical transmission link for transmitting multiplexed optical signals comprising:
    a first circularly polarized single mode optical waveguide fiber having a beat length and an axial twist along its length wherein, the pitch of the axial twist is shorter than the beat length and the pitch is either right-handed or left-handed along the fiber length;
    a transmitter module, for generating optical signals, optically coupled to the first circularly polarized waveguide fiber to launch into the circularly polarized waveguide fiber a plurality of optical signals, wherein each optical signal has a unique wavelength;
    additional circularly polarized single mode optical waveguide fibers optically coupled end to end one to another in sequence, one of the additional circularly polarized fibers being optically coupled to the first circularly polarized waveguide fiber, wherein the additional circularly polarized waveguide fibers have respective beat lengths and axial twists along their respective lengths, wherein, the pitch of the axial twist is shorter than the beat length in each of the respective additional fibers and the pitch of each is either right-handed or left-handed along the fiber length;
    a receiver module, to receive the plurality of optical signals, optically coupled to the last circularly polarized waveguide fiber in the additional fiber sequence wherein, the signals are separated in accordance with their respective wavelengths.

2. The optical transmission link of claim 1 further comprising at least one optical amplifier inserted and optically coupled between two of the circularly polarized waveguide fibers.

3. The optical transmission link of claim 1 further comprising at least one optical amplifier inserted and optically coupled between every pair of circularly polarized waveguide fibers in the sequence.

4. The optical transmission link of claim 1 wherein;
    the transmitter module includes a number N of light sources each having a linear polarization and a unique wavelength to provide N signal channels,
    a WDM having N input ports and at least one output port,
    N optical fibers to optically couple the N respective light sources to a respective one of the N WDM input ports,
    N/2 half wavelength retarders, a respective one of which is optically coupled in series arrangement to every other one of the N signal channels so that adjacent wavelength channels have a linear polarization orthogonal each to the other, and,
    an optical coupling through a quarter wavelength plate from the at least one WDM output port to the first circularly polarized waveguide fiber in the optical transmission link to change the linear polarization of the signals of the respective channels to circular polarization.

5. The optical transmission link of claim 1 wherein;
    the transmitter module includes a number of light sources N each having a unique wavelength,
    a WDM having N input ports and at least one output port, and
    N optical fibers to optically couple the N respective light sources to a respective one of the N WDM input ports,
    N quarter-wave retarders optically coupled respectively in series arrangement to a respective one of the N optical fibers, wherein,
    the fast axis of the quarter-wave retarders of adjacent signal wavelength channels are orthogonal, and
    an optical coupling from the at least one WDM output port to the first circularly polarized waveguide fiber in the optical transmission link.

6. The optical transmission link of claim 1 wherein,
    the receiver module includes a WDM demultiplexer having at least one input port and N output ports, wherein the at least one input port is optically coupled to the last circularly polarized fiber in the sequence of circularly polarized fibers,
    a first set of N waveguide fibers, having a first and a second end, the respective first ends of the N waveguide fibers being optically coupled to a respective one of the N output ports of the WDM demultiplexer,
    N filters, each of which passes a respective one of the N signal wavelengths, optically coupled to a respective one of the N waveguide fibers,
    N receivers for receiving a respective one of the N signals, and,
    a second set of N waveguide fibers optically coupled a between a respective one of the N filters and a respective one of the N receivers.

7. The optical transmission link of claim 6 wherein the receivers of the receiver modules are polarization sensitive and the receiver module further includes,
    a quarter wavelength retarder optically coupled in series arrangement between the at least one input port of the WDM demultiplexer and the last circularly polarized fiber in the sequence of circularly polarized fibers to change the circularly polarized light signals to linearly polarized light signals, and,
    N/2 half wavelength retarders, a respective one of which is optically coupled in series arrangement with a respective every other one of the second set of N fibers so that the linear polarization of the signals of adjacent wavelength channels are orthogonal.

8. The optical transmission link of claim 6 wherein the receivers of the receiver modules are polarization sensitive and the receiver module further includes,
    a respective one of N quarter wavelength retarders optically coupled in series arrangement with a respective one of the second set of N fibers, wherein the fast axis of the quarter wave retarders of adjacent wavelength channels is oriented so that the signals of the adjacent channels are circularly polarized in opposite directions.

9. An optical switch for use in the transmission link of claim 1 comprising:
    one or more optical phase shifting circuits optically coupled to a circularly polarized waveguide fiber in the transmission link, to shift the phase of a respective one or more optical signals propagating in the transmission link, wherein,
    a control signal is used to change the phase of the optical signal by means of cross phase modulation, and,
    the cross phase modulation takes place in a length of circularly polarized waveguide fiber.

10. The optical switch of claim 9 wherein the phase shifting circuit further includes means for imparting a circular polarization to the control signal and the optical signal prior to the propagation of the control signal and optical in the circularly polarized waveguide fiber length over which the cross phase modulation occurs.

11. The optical switch of claim 9 wherein the phase shifting circuit further includes means for passing the optical signal and reflecting or absorbing the control signal.

12. The optical switch of either one of claims 10 or 11 wherein the phase shifting circuit includes a non-linear optical loop mirror having circularly polarized fiber for at least a portion of the loop over which the cross phase modulation occurs.

13. The optical switch of claim 12 wherein a first polarization sensitive WDM coupler is used to insert the control pulse into the non-linear optical loop mirror and a second polarization sensitive WDM coupler is used extract the control pulse from the non-linear optical loop mirror.

14. The optical switch of either one of claims 10 or 11 wherein the phase shifting circuit includes, a control pulse link for propagating the control pulse and controlling its polarization state, a polarization sensitive coupler for coupling the signal pulse into the control pulse link, an interaction length of circularly polarized waveguide fiber over which the cross phase modulation takes place, and, a polarization sensitive filter optical connected to the end of the interaction length of circularly polarized fiber to pass the signal pulse and reflect the control pulse.

15. The optical switch of claim 9, wherein the polarization state in the CPF of the optical signal relative to the polarization state in the CPF of the control pulse is random.

* * * * *

UNITED STATES PATENT AND TRADEMARK OFFICE
CERTIFICATE OF CORRECTION

PATENT NO. : 6,229,937 B1
DATED : May 8, 2001
INVENTOR(S) : Daniel Aloysius Nolan and Mohammed Nazrul Islam Page 1 of 1

It is certified that error appears in the above-identified patent and that said Letters Patent is hereby corrected as shown below:

<u>Title page,</u>
Item [63], Related U.S. Application Data, the third line of said paragraph should read -- Sept. 17, 199<u>8</u>. --

Signed and Sealed this

Seventh Day of May, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.    : 6,229,937 B1
DATED         : May 8, 2001
INVENTOR(S)   : Daniel Aloysius Nolan and Mohammed Nazrul Islam It is certified that error appears in the above-identified patent and that said Letters Patent is hereby corrected as shown below:

<u>Title page,</u>
Item [73], Assignee: should be -- Corning Incorporated, Corning, New York (US) and The Regent of the University of Michigan, Ann Arbor, MI (US) --, instead of just Corning Incorporated.

Signed and Sealed this

Ninth Day of July, 2002

Attest:

JAMES E. ROGAN
Attesting Officer    Director of the United States Patent and Trademark Office

UNITED STATES PATENT AND TRADEMARK OFFICE
CERTIFICATE OF CORRECTION

PATENT NO.        : 6,229,937 B1
APPLICATION NO. : 09/339446
DATED             : May 8, 2001
INVENTOR(S)       : Daniel Aloysius Nolan and Mohammed Nuzrul Islam It is certified that error appears in the above-identified patent and that said Letters Patent is hereby corrected as shown below:

| Col. | Line | Description |
|---|---|---|
| 1 | 9 | After "Sept. 22, 1998", Insert a new paragraph as follows: --This invention was made with government support under Department of Defense Contract No. MDA904-94-C-6243.-- |

Signed and Sealed this

Twentieth Day of February, 2007

JON W. DUDAS
*Director of the United States Patent and Trademark Office*